Aug. 14, 1945.     G. F. RACKETT     2,382,580
OPTICAL ADJUSTMENT
Filed Feb. 10, 1942
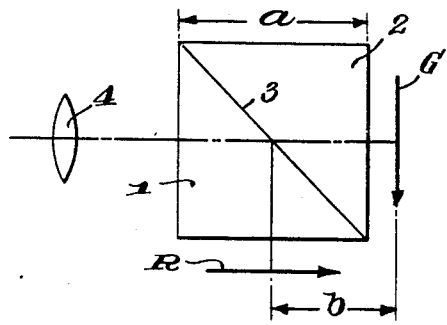
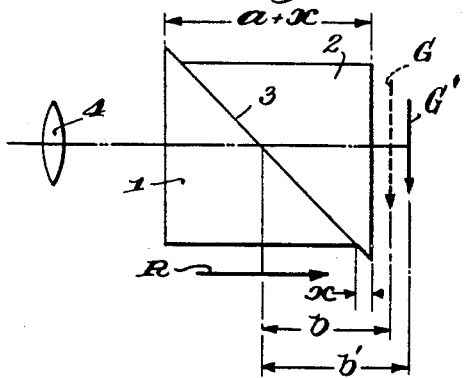
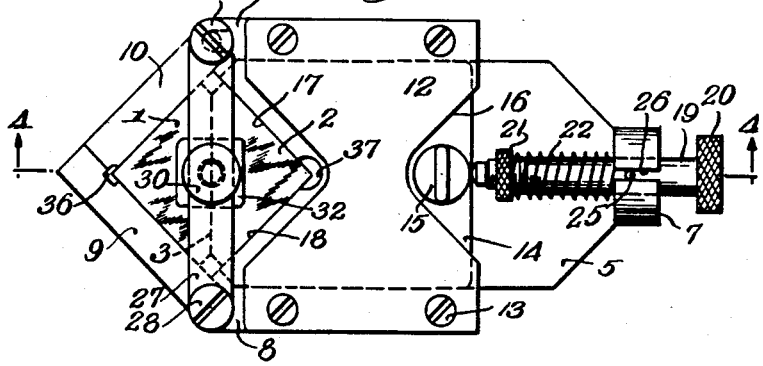
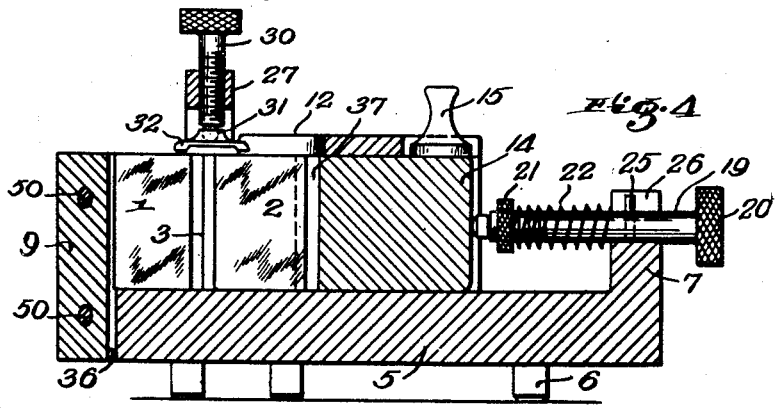
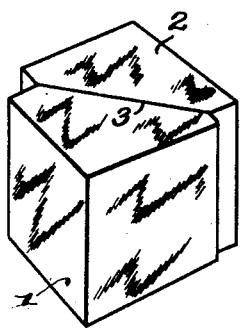
Inventor
Gerald F. Rackett,
by Roberts, Cushman & Woodbury
his Attys.

Patented Aug. 14, 1945

2,382,580

UNITED STATES PATENT OFFICE 2,382,580

OPTICAL ADJUSTMENT

Gerald F. Rackett, Los Angeles, Calif., assignor to Technicolor Motion Picture Corporation, Hollywood, Calif., a corporation of Maine Application February 10, 1942, Serial No. 430,204

4 Claims. (Cl. 88—1)

This invention relates to the manufacture of optical systems, such as shown for example in the cinematographic camera Patent 2,072,091 granted March 2, 1937, in which a prism unit reflects a part of the light to one film gate and transmits the rest of the light to another film gate, the unit comprising front and rear right-angle isosceles prisms cemented together in the form of a cube with their juxtaposed faces extending between opposite corners of the cube and with a partially-reflecting and partially-transmitting metallic deposit on one of said faces. In cameras of this type it is essential that the focal planes at the two film gates coincide with the position of the films in the film gates and also that the images in the two film gates be of the same size so that they will register exactly when the resulting pictures are later superposed. Notwithstanding the greatest care and precision in the manufacture of the various parts of the camera it is necessary to have some way of adjusting the size and position of the image at one film gate in relation to the image at the other film gate in order to make them exactly equal in size and to make the focal planes correspond exactly with the position of the films in the film gates.

Objects of the present invention are to provide a method of effecting the aforesaid adjustment which is simple and facile in operation, which requires no delicate adjusting apparatus likely to get out of order, which permits the prism unit to be quickly and easily removed for cleaning purposes and which minimizes the danger of the unit accidentally getting out of adjustment.

According to the present invention the size of the images in the two focal planes is matched precisely by shifting one prism relatively to the other along their abutting faces so as to vary the length of the glass path of the transmitted light without varying the length of the glass path of the reflected light. This adjustment concomitantly varies the size and the focal plane of the transmitted image. As the glass path of the transmitted light is increased the image is made smaller and brought to a focus at a greater distance from the lens. Conversely as the length of the glass path of the transmitted light is shortened the transmitted image is increased in size and brought to a focus closer to the lens. If the focal plane of the transmitted image does not coincide exactly with the plane of the film when the two images are equal in size, it is usually immaterial if the difference in focus between the two images does not exceed .0015".

To determine how much the prisms should be shifted relatively to each other the prisms are preferably cemented together in what should be substantially the correct relationship and then the unit is mounted in the camera for test purposes. The best procedure is to photograph a chart and then, after the negatives exposed in the two film gates are developed, the dimensions and sharpness of the two pictures are carefully compared with a toolmaker's microscope. If the tests indicate that an adjustment of the prisms is needed, the necessary increase or decrease in the length of the glass path of the transmitted light is computed from the results of the photographic test. Then the prism is removed, the cement between the two prisms is softened by heat, the relative positions of the prisms is adjusted the required amount and the cement is again caused to set.

Referring to the accompanying drawing:

Figs. 1 and 2 are diagrams illustrating the effect of the aforesaid adjustment;

Fig. 3 is a plan view of a press for use in making the adjustment;

Fig. 4 is a section on line 4—4 of Fig. 3; and

Fig. 5 is a perspective view of the prism unit.

In the illustration the prism unit comprises a front prism 1 and a rear prism 2 cemented together along the plane 3 with a thin deposit of metal on one of the meeting faces of the prisms to reflect part of the light to form the image R and transmit the rest of the light to form the image G, the images being formed by the lens 4 in the path of the incident light. In Fig. 1 $a$ represents the distance between the faces through which the transmitted light enters and leaves the prism unit and $b$ represents the distance, measured along the optical axis, between the light-dividing surface and the focal plane of the transmitted light. In Fig. 2 the rear prism 2 has been shifted to increase the length of the path of the transmitted light by the amount $x$, making the length of the glass path of the transmitted light $a$ plus $x$. The effect of this increase is to shift the transmitted image from G to G', so that the distance between the light-dividing surface and the focal plane is $b'$ instead of $b$, the size of the transmitted image being reduced as indicated.

The press illustrated in Figs. 3 and 4 comprises a rigid base 5 supported by feet 6 and provided with an upstanding lug 7. Fast to the sides of the base 5 are upstanding side walls 8, 9, 10 and 11, the walls 9 and 10 being inclined to the walls 8 and 11 so as to meet each other at a right angle. The walls 9 and 10 are secured together by screws 50 (Fig. 4) and each of the four walls is secured to the base in like manner. Interconnecting the sides 8 and 11 is a cover plate 12 secured to the upper edges of the side walls 8 and 11 by means of screws 13. Slidably mounted in the space between the base 5, side walls 8 and 11 and the cover 12 is a block 14 having a handle 15 extending up through a recess 16 in the cover and having its forward end recessed to form two faces 17 and 18 meeting at a right angle. For the purpose of yieldingly pushing the block 14 to the left a plunger 19 is slidably mounted in the upstanding lug 7, the left-hand end of the plunger bearing on the rear face of the block 14 and the right-hand end having a head 20 for manipulating the plunger. A nut 21 is threaded on the left-hand end of the plunger and a spring 22 is superposed between the nut and the upstanding lug 7. A pin 23 fastened to the plunger projects upwardly in a slot 26 in the upper end of the lug 7. To increase the pressure on the block 14 the nut 21 is threaded to the right to increase the compression of the spring 22. To render the plunger inoperative it is pulled to the right until the pin 25 leaves the slot 26 and it is then rotated until the projecting portion of the pin 25 engages behind the lug 7.

A flat bar 27 is pivotally mounted by a screw 28 at the junction between the side walls 8 and 9, the other end of the bar being provided with a recess to receive another screw 29 at the junction between the side walls 10 and 11. Extending vertically through the center of the bar is a screw 30 and mounted on the lower end of the screw by means of a universal joint 31 is a shoe 32 which may have a pad mounted in the recess in its under side.

After determining the extent to which the prisms should be shifted relatively to each other, the prism unit is heated in an oven until the cement between the prisms is softened sufficiently to permit one prism to slide relatively to the other prism. The press shown in Figs. 3 and 4 is also heated to avoid the shock of temperature differential between the metal of the press and the glass of the prism when the prism is placed in the press. To insert the prism in the press the screw 29 is loosened sufficiently to permit the bar 27 to be swung about the pivot 28 counter-clockwise (Fig. 3) from above the space between the walls 9 and 10 and the faces 17 and 18. With the block 14 and plunger 19 retracted, the prism is placed in the position shown in Figs. 3 and 4 and the bar 27 is returned to the operative position shown in Figs. 3 and 4. If the adjustment is to be in the direction indicated in Fig. 2 shims are placed between the wall 9 and the corresponding face of the prism 1. Then the screw 30 is threaded downwardly to insure that both prisms rest squarely on the base 5 and the plunger 19 is put in the operative position shown in Figs. 3 and 4 to permit the spring 22 to press the block 14 against the prism 2. As shown in Figs. 3 and 4 recesses 36 and 37 are provided to avoid injury to the edges of the prisms. Owing to the shims between the wall 9 and the corresponding face of prism 1, the prism unit is located slightly off center (above the longitudinal central plane of the press in Fig. 3). Consequently the face 17 of the block 14 engages the prism 2 before the face 18 reaches the prism, whereby the pressure of the spring 22 causes the prism 2 to slide relatively to the prism 1 in the direction indicated in Fig. 2 until the prism also engages face 18, the degree of shift depending upon the thickness of the shims. If the adjustment should be in the opposite direction the shims are placed between the wall 10 and the corresponding face of the prism 1. Pieces of smooth paper are preferably placed between the faces of the prisms and the opposed faces of the press to avoid scratching the polished faces of the glass. After the prisms have been adjusted to their new position relatively to each other, the unit is baked to reset the Canada balsam or other cement employed to hold the two prisms together.

From the foregoing it will be evident that this method of adjustment affords a precise way of equalizing the size of the two images without requiring any delicate adjusting mechanism in the camera which would be likely to get out of order.

It should be understood that the present disclosure is for the purpose of illustration only and that this invention includes all modifications and equivalents which fall within the scope of the appended claims.

I claim:

1. In the art of optical systems of the type having a focusing lens and a light divider comprising front and rear prisms with a partial reflecting surface therebetween, part of the light being transmitted through the reflecting surface and thence through the rear prism to one focal plane and part of the light being reflected by said surface laterally through the front prism to a second focal plane, the method of manufacture which comprises cementing the prisms together in approximately correct relationship, simultaneously exposing two films in said planes respectively with light transmitted through said prisms, developing the films and comparing the developed records to determine the difference between the two records in size and sharpness and, while the cement between the two prisms is sufficiently soft to permit them to be shifted relatively to each other, shifting one prism relatively to the other along their abutting faces an amount corresponding approximately to said difference so as to vary the length of the glass path of the transmitted light without varying the length of the path of the reflected light, whereby images of substantially the same size may be formed substantially in said planes respectively.

2. In the art of optical systems of the type having a focusing lens and a light divider comprising front and rear prisms with a partial reflecting surface therebetween, part of the light being transmitted through the reflecting surface and thence through the rear prism to one focal plane and part of the light being reflected by said surface laterally through the front prism to a second focal plane, the method of manufacture which comprises cementing the prisms together in approximately correct relationship, simultaneously exposing two films in said planes respectively with light transmitted through said prisms, developing the films and comparing the developed records to determine the difference between the two records in size and sharpness, softening the cement between the two prisms sufficiently to permit them to be shifted relatively to each other while still adhering to each other, and shifting one prism relatively to the other along their abutting faces an amount corresponding approximately to said difference so as to vary the length of the glass path of the transmitted light without varying the length of the path of the reflected light, whereby images of substantially the same size may be formed substantially in said planes respectively.

3. In the art of optical systems of the type having a focusing lens and a light divider comprising front and rear prisms with a partial reflecting surface therebetween, part of the light being transmitted through the reflecting surface and thence through the rear prism to one focal plane and part of the light being reflected by said surface laterally through the front prism to a second focal plane perpendicular to the first plane, the method of manufacture which comprises cementing the prisms together in approximately correct relationship, simultaneously exposing two films in said planes respectively with light transmitted through said prisms, developing the films and comparing the developed records to determine the difference between the two records in size and sharpness and, while the cement between the two prisms is sufficiently soft to permit them to be shifted relatively to each other, and shifting one prism relatively to the other, in the direction which bisects the angle between said planes, an amout corresponding approximately to said difference so as to vary the length of the glass path of the transmitted light without varying the length of the path of the reflected light, whereby images of substantially the same size may be formed substantially in said planes respectively.

4. In the art of optical systems of the type having a focusing lens and a light divider comprising front and rear prisms with a partial reflecting surface therebetween, part of the light being transmitted through the reflecting surface and thence through the rear prism to one focal plane and part of the light being reflected by said surface laterally through the front prism to a second focal plane perpendicular to the first plane, the method of manufacture which comprises cementing the prisms together in approximately correct relationship, simultaneously exposing two films in said planes respectively with light transmitted through said prisms, developing the films and comparing the developed records to determine the difference between the two records in size and sharpness, softening the cement between the two prisms sufficiently to permit them to be shifted relatively to each other while still adhering to each other, and shifting one prism relatively to the other, in the direction which bisects the angle between said planes, an amount corresponding approximately to said difference so as to vary the length of the glass path of the transmitted light without varying the length of the path of the reflected light, whereby images of substantially the same size may be formed substantially in said planes respectively.

GERALD F. RACKETT.